United States Patent [19]

Willoteaux

[11] 3,790,763
[45] Feb. 5, 1974

[54] DIFFERENTIAL AND DISCONNECTIBLE ELECTRONIC CIRCUIT SYSTEM

[75] Inventor: Guy C. Willoteaux, Saint Germain en Laye, France

[73] Assignee: Societe Francaise d'Equipiments pour la Navigation Aerienne, Velizy Villacoublay, France

[22] Filed: July 26, 1971

[21] Appl. No.: 165,910

[30] Foreign Application Priority Data
July 27, 1970 France .............................. 70.27637

[52] U.S. Cl. ............................................ 235/150.1
[51] Int. Cl. ............................................. G05b 11/01
[58] Field of Search ....... 318/591; 235/151.1, 150.1

[56] References Cited
UNITED STATES PATENTS
3,540,001 11/1970 Gormley et al. ............. 235/151.1 X Primary Examiner—Eugene G. Botz
Attorney, Agent, or Firm—Eric H. Waters et al.

[57] ABSTRACT

A disconnectible electronic control system which automatically assumes zero during disconnection and which at the instant of re-connection gives a zero value signal. In connection with a controlled system, a detector provides a signal depending on the controlled parameter in the controlled system. A control command device provides a signal depending on the control command and a comparator receives at a first input the signal coming from the detector and at a second input the signal coming from the said control command device. An actuator acts on the controlled parameter. A secondary control loop is formed whose output signal can modify the signal coming from the said control command device. A switch is used with two positions, namely a connected position in which the output signal from the comparator is applied to the actuator to form a main control loop and a disconnected position where the output signal of the comparator is fed to the input of the secondary control loop.

11 Claims, 6 Drawing Figures

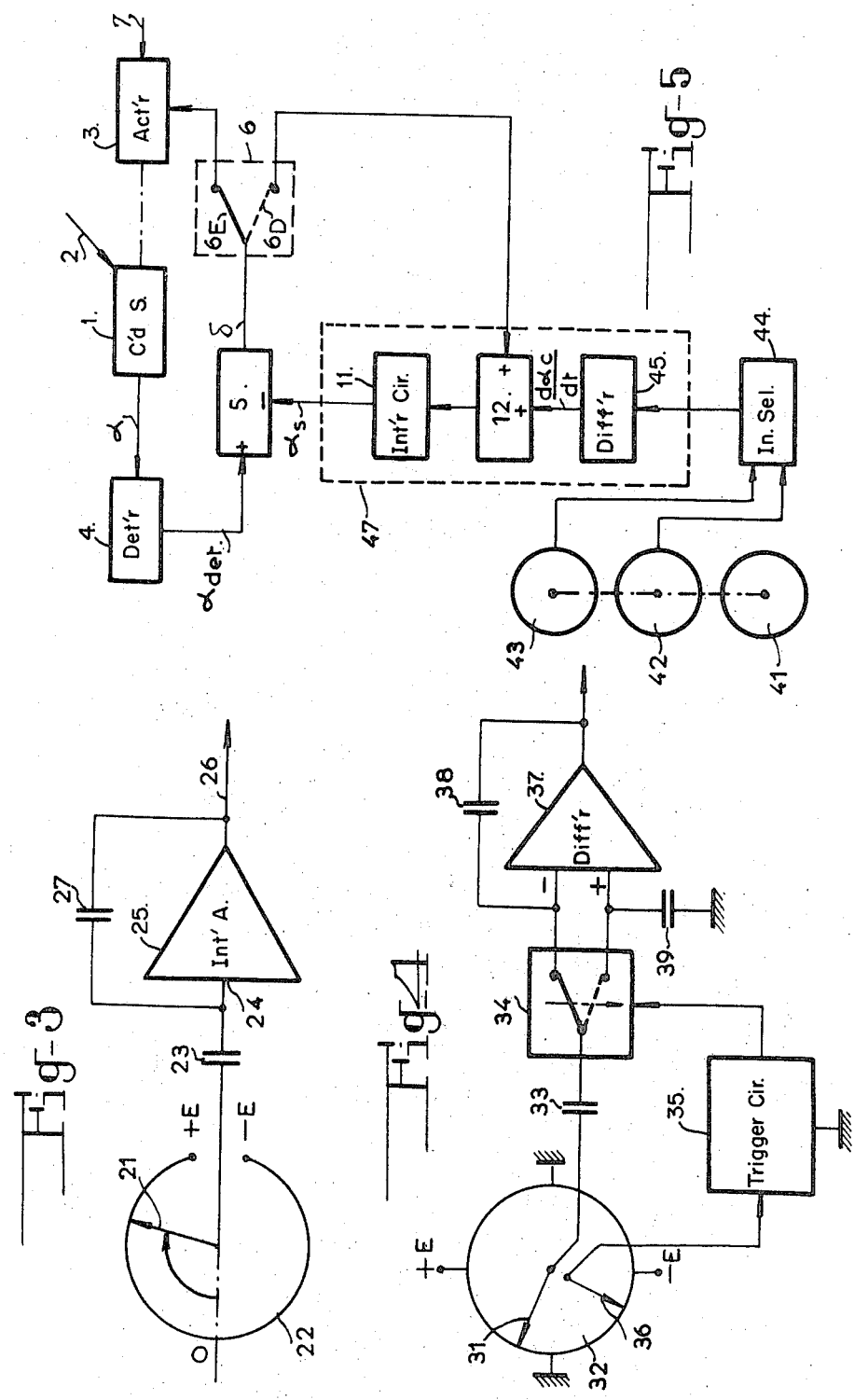

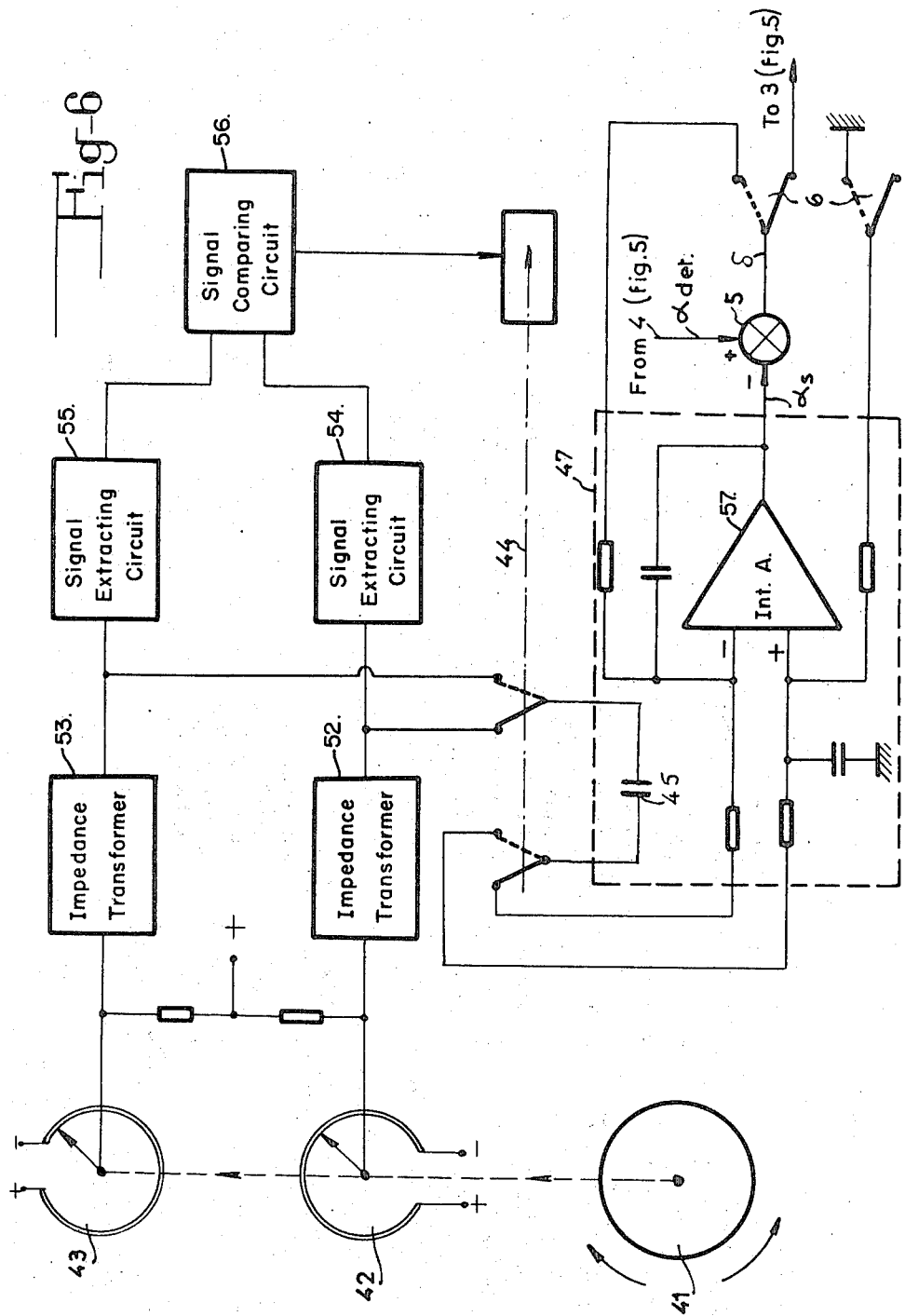

DIFFERENTIAL AND DISCONNECTIBLE ELECTRONIC CIRCUIT SYSTEM

The invention relates generally to electronic controls with feedback or control loops which continuously compares the command given and its execution, to derive a difference signal which is fed back to the associated control. For example, in an aircraft, an automatic pilot may compare the actual position of longitude and a command value and, depending on the difference, may send a command to rudder and aileron controls.

More precisely, the invention applies to electronic controls of the above-mentioned type which can be disconnected. In the field of these controls, controlled magnitudes exist which are susceptible during disconnection to independent variations coming, for example, from another control or due to disturbances. This is the case for a control for the longitudinal position of an aircraft. While the automatic pilot is disconnected, this position varies and it is thus necessary that, at the time of reconnection, the electronic control (the automatic pilot in the aforesaid example) reassume its action without discontinuity since a discontinuity, might be dangerous. In other words, its initial action, at the time of reconnection, must start from zero whatever the value at this instant of the parameter to be controlled. It is thus necessary that, just before and during the reconnection of the control, the system feed back a zero signal at its output to the controlled member, and this is irrespective of the real position of the control member, and irrespective of the real value of the parameter controlled whereas, when the control is connected, its output signal, as already mentioned, depends on the aforesaid difference.

An object of the invention is to fulfill this requirement.

Consequently, an object of the invention is to provide an electronic control which automatically assumes as a reference a value of zero for each connection irrespective of the real value of the controlled parameter and the real postion of the control member.

Briefly, the control according to the invention comprises, in addition to a main control loop (which in the disconnected position is separated from the controlled member), a secondary control loop which in the disconnected position returns the signal at the output of the main loop to zero. More preceisely, a standard comparator in the main control loop, which sends to the controlled member the difference signal between the signal of the controlled parameter and the signal coming from the control member, receives, in place of the command signal, the output signal from the secondary control loop. Preferably this secondary control loop, comprising an integrator circuit and a summation means or summator, receives in the disconnected position the output signal from the said comparator and returns to the said comparator in place of the signal from the control member, the output signal from the arrangement in accordance with the invention, which output signal is the total provided by the summator of the signal from the control member and of the signal coming from the integrator circuit. According to another arrangement of the invention, on the contrary, the said summator receives the difference of the control command on the one hand and the output signal of the comparator on the other hand and supplies an integrator circuit which in turn supplies the said comparator. In both arrangements in accordance with the invention, in the connected position, the secondary control loop is cut off from the output of the comparator but remains connected to the input of the comparator. The aforesaid integrator circuit may be of the digital type, but in order to avoid coding and derivation, it is preferably of the analogue type, which moreover allows a simpler construction.

Embodiments of the invention will now be described by way of example, with reference to the accompanying drawings, in which:

FIG. 3 is a diagram of an arrangement which is theoretical and given as an explanation of a control member with an integrator amplifier;

FIG. 4 is a diagram similar to FIG. 3 of an arrangement, according to the invention, of a control member with a differential amplifier;

FIG. 5 is a view, similar to FIG. 2, which shows an operation of the latter and

FIG. 6 shows certain details of FIG. 5.

Figure 1:
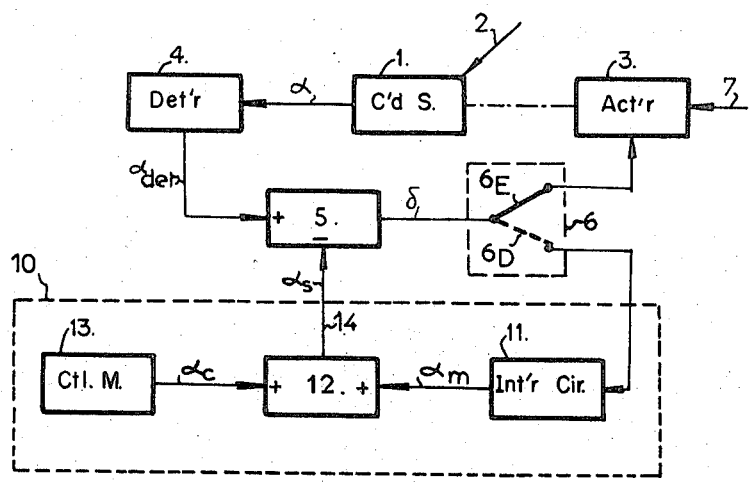
FIG. 1 is a block diagram illustrating a first arrangement according to the invention.

Referring to FIG. 1, this block diagram illustrates a device according to the invention. the controlled system 1, possibly subject to disturbances 2, is controlled by an actuator 3, and the value of the considered parameter a is determined by a detector 4 feeding a signal $\alpha$ detected to a comparator 5, the difference signal $\delta$ of which is fed to a switch 6. In the connected position $6_E$ this switch sends the difference signal $\delta$ to the actuator 3 and in the disconnected position $6_D$ it sends it to the device 10 according to the invention. This device 10 comprises an integrator circuit 11 feeding a signal $\alpha_M$ to a summator 12, also receiving a signal $\alpha_c$ from the control member 13, and the summator 12 feeds to the said comparator 5 a signal $\alpha_s$ which is the output signal of the device according to the invention.

It is clear that : $\alpha_s = \alpha_c + \alpha_M$ and $\delta = \alpha_{detected} - \alpha_s = \alpha_{detected} - \alpha_c - \alpha_M$ In the disconnected position, as already stated $\delta = 0$, thus $\alpha_M = \alpha_{detected} - \alpha_c$ and $\alpha_{detected}$. It will thus be noted that, in the disconnected position, at the output 14 of the secondary control loop according to the invention, there is reproduced the signal $\alpha_{detected}$ or $a_{det}$ provided by the detector 4 of the considered parameter. It will be noted that this is obtained even if disturbances 2 act on the controlled system 1 or even if its actuator 3 is subject to an external command 7 and irrespective of the command $\alpha_c$ coming from the control member 13. On the other hand, in the connected position, the logical circuit 11 emits a constant signal $\alpha_M$, and the main control loop cancels the difference signal $\delta$ by acting on the actuator 3 and controlled system 1, which furnish the changing valves of $\alpha$ and $\alpha_{detected}$.

Figure 2:
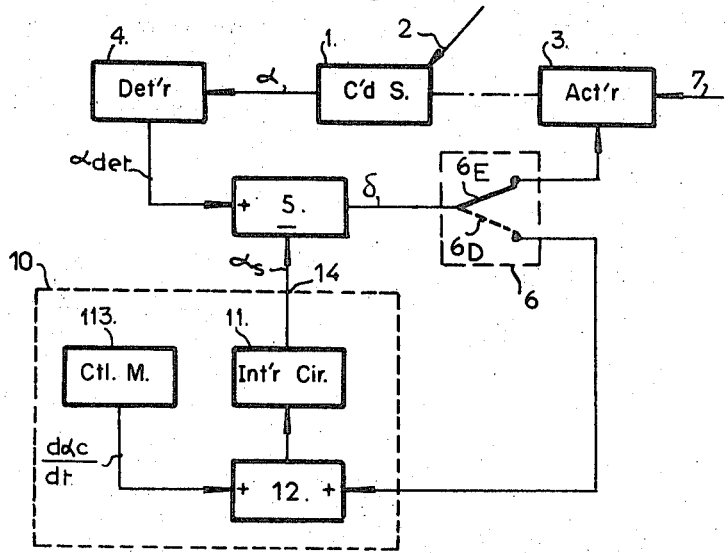
FIG. 2 is a block diagram which illustrates another arrangement according to the invention.

Referring to FIG. 2 whose block diagram shows another arrangement according to the invention, there can be seen the same parts with the same references but here, the summator 12 receives the signal $\delta$ (with switch 6 in the position $6_D$) and the differentiated signal $d\alpha_c/dt$ and supplies the integrator circuit 11. The circuits illustrated in FIGS. 1 and 2 are practically identical and the effects produced by these two circuits are the same. The chief difference between these two circuits lies in the fact that in FIG. 1, integrator 11 is located in front of the summator 12, whereas in FIG. 2 the integrator 11 is located after the summator. For that reason, in order to obtain a signal $\alpha_s$ in FIG. 2 analogous to the one in FIG. 1, namely $\alpha_s = \alpha_c + \alpha_m$, the summator 12 must be fed not with the signal $\alpha_c$ which after integration would become a function of the form $\alpha_c(t) + k$, but with a signal $d\alpha_c/dt$ when integrated. Consequently, the controller member 113 of FIG. 2 necessarily comprises a shunting device.

The importance of th circuit shown in FIG. 2 lies in its lending itself better to the embodiment described hereinafter relative to FIG. 5. In fact, in the FIG. 5 embodiment, as will be seen, the control member 41 actuates two potentiometers 42 and 43, whose outputs are switched by an input selector 44. The signal delivered by this selector is derived by differentiator 45. This derived signal is prescribed by the potentiometric type of circuit consisting of the potentiometers 42 and 43.

FIG. 3 is a potentiometer circuit assembly serving to realize the arrangement 10 in FIG. 2. In this assembly, the control member 13 is constituted by the potentiometer 22. The signal from the potentiometer is differentiated with respect to time by the capacitor 23 which gives $d\alpha_c/dt$. The integrator 11 is constituted by the operational amplifier 25 with the feed back capacitor 27. Not shown in FIG. 3 is the connection with the switch 6. FIG. 3 shows the drawback which is presented by the discontinuity of the track of the potentiometer 22.

Referring to FIG. 3, the control knob or wheel operates in direct manner, the slider 21 of a potentiometer 2 supplied with a voltage E. The slider 21 is connected by a capacitor 23 to the input 24 of an integrator amplifier 25, the output 26 of which is fed-back via a capacitor 27, to the input 24. The transfer operation of the slider 21 at the output 26 is equivalent to a gain, and a variation of the position of the slider 21 causes a proportional variation of the output voltage 26. Nevertheless, in the present invention, the position of the slider 21 at the moment of reconnection is not zero (as shown) but can be any position as aforementioned. Due to this fact, the discontinuity of the track of the potentiometer 22 is inadmissible. To explain why discontinuity of the potentiometer track is inadmissible, one may take as an example the case where the potentiometer slider is in the position +E at the instant of reconnection. In this case, it is impossible to supply an increasing control signal. The opposite would be the case if one were at the point —E at that instant. Therefore, the invention provides arrangements, which will be described for eliminating this possibility.

Referring to FIG. 4 wherein is shown an arrangement according to the invention, the wheel actuates the slider 31 of a potentiomenter 32 with a continuous track. The slider 31 is connected by a capacitor 33 to a reversing switch 34, controlled by a trigger circuit 35 supplied by a second slider 36 staggered 90° relative to the slider 31. The two outputs of the reversing switch 34 lead respectively to the + and — inputs of a differential integrator 37, provided with a capacitor 38 between the output and — input, and with a capacitor 39 between + input and ground. It is clear that the trigger circuit 35, while the reversing switch 34 is switched over, restores the same direction of variations of the output voltage for variations of position of the same direction of the slider 31 on both halves of the continuous track of the potentiometer 31 at each side of its two supply points.

Another arrangement according to the invention may use, in place of the said potentiometer with two sliders, an inductive potentiometer, a resolver, a selsyn or two potentiometers which will be described with reference to FIG. 5. In this figure, the parts already described with regard to FIG. 2 have the same references. In this case, the drive member 41, which may be a control knob or, actuates two potentiometers 42 and 43 of the current type, whose outputs are switched by an input selector 44. The latter actuates a differentiator 45, which supplies the signal $d\alpha_c\,_/dt$ to the summator 12 cby the analogue integrator 11. The differentiator 45, the summator 12 and the analogue integrator 11 preferably form one and the same system 47, with the correlating advantages of simplicity, economy, speed of response and reduction in size. Details of such an embodiment are described with reference to FIG. 6 wherein the two potentiometers 42 and 43 actuated by the control 41 are present. The outputs of these two potentiometers each actuate an impedance transformer 52 and 53 at the outputs of which the modulus or absolute value of the signals supplied by the circuits 54 and 55 are compared by a circuit 56 actuating the control coil 44a of said input selector 44, the latter actuating the said system 47, constructed around the integrator amplifier 57.

For a better understanding of FIGS. 5 and 6, it should be noted the operational amplifier 57 (FIG. 6) assumes the functions of the circuits 11 and 12 of FIG. 5. This operational amplifier 57 could be replaced by a first operational amplifier assembled with a summator followed by a second operational amplifier assembled with an integrator. to this effect, the replacement of the operational amplifier 57 by the two operational amplifiers mentioned mentioned hereinabove (summator and integrator) becomes necessary when a known variable gain element is utilized to automatically modify the sensitivity of the control as a function of a detected parameter of the control member. The variable gain is thus interposed between said operational amplifier (summator) and said operational amplifier (integrator).

The circuits 54 and 55 of FIG. 6 furnish absolute or modulated values of the signals coming from the impedance transformers 52 and 53. These types of circuits which furnish the absolute value or the modulated value of a signal are well known in the electronic art and there is no need to provide any further description. The same applies to the circuit 56 which is a conventional comparator.

Impedance transformers 52 and 53 are coupled to the circuits 54 and 55 (of modulated or absolute value) which furnish at their outputs absolute or modulated values of the signals coming from said impedance transformers 52 and 53. The circuits 54 and 55 are connected to a comparator 56 which effects the control of said input selector 44. The input selector 44 actuates the system 47 and is constructed around the integrator amplifier 57.

What we claim is:

1. A disconnectible electronic control which is adapted for use with a controlled system wherein is a controlled magnitude and which control automatically assumes zero reference during disconnection and at the instant of connection gives a zero value signal whose derivative as a function of time is consequently equal to zero, said control comprising a detector supplying a signal dependent on the controlled magnitude in the system, control means supplying a control signal, comparator means including positive and negative inputs, said comparator means receiving on its positive input the signal from the said detector and on its negative input the signal from the said control means, an operator means acting on the said controlled magnitude, a secondary control loop which in the disconnect position of the said electronic control keeps the output signal of the said comparator means at zero, and switch means having one connect position whereat the output signal from the said comparator means is applied to the said operator means thus forming a main control loop, and a disconnect position whereat the output signal from the said comparator means is applied to the input of the said secondary control loop.

2. A control as claimed in claim 1, wherein the said secondary control loop comprises an integrator circuit receiving in the disconnect position of the said switch means the output signal from the said comparator means, and a summator receiving the signal dependent on the control sequence and the output signal from the said integrator circuit, the output signal of the said summator being applied to the negative input of the said comparator means.

3. A control as claimed in claim 1, wherein the said secondary control loop comprises a summator receiving, in the disconnect position of the said switch means, the output signal from the said comparator means and receiving the differential with respect to time of the said signal dependent on the control sequence, and an integrator circuit receiving the output signal from the said summator, the output signal from the said integrator being applied to the negative input of the said comparator means.

4. A control as claimed in claim 3 comprising a continuous-track potentiometer including two 90° lag sliders, one of the sliders being actuated by the said control means, a reversing switch, a trigger action means and a differential integrator, the trigger action means being controlled by the other of said sliders, the reversing switch being actuated by the trigger action means and feeding the differential integrator.

5. A control as claimed in claim 4, comprising two potentiometers actuated by the said sequential control means, an input selector actuated by the two potentiometers dnd a network actuated by the said selector, comprising a differentiator, the said summator and an analog integrator.

6. a control according to claim 1, in which the said secondary control loop comprises an integrator circuit receiving in the disconnected position of the said switch means, the output signal from the said comparator means and summation means receiving the said signal from said control means and the output signal from the said integrator circuit, the output signal from the said summation means being applied to the second input of the said comparator means.

7. A control according to claim 6, in which the said integrator circuit is an analogue integrator circuit.

8. a control system according to claim 6 in which the said secondary control loop comprises summation means receiving, in the disconnected position of the said switch means, the output signal from the said comparator means and receiving the differential with respect to time, of the said signal from said control means, and an integrator circuit receiving the output signal from the said summation means, the output signal of the said integrator circuit being applied to the second input of the said comparator.

9. A control according to claim 6, in which the said integrator circuit is an analogue circuit.

10. A control system according to claim 9, comprising two potentiometers actuated by the control command actuator, an input selector actuated by the two potentiometers, and a secondary system actuated by the said selector and comprising a differentiator and further constituted by the said summation in and the said analogue integrator.

11. A control according to claim 10, in which the said system actuated by the said selector comprises only one integrator amplifier.

* * * * *